United States Patent
Miyagi

(10) Patent No.: US 8,363,125 B2
(45) Date of Patent: Jan. 29, 2013

(54) IMAGE PROCESSING APPARATUS, IMAGE PROCESSING METHOD, AND COMPUTER PROGRAM PRODUCT

(75) Inventor: Noriko Miyagi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 365 days.

(21) Appl. No.: 12/591,870

(22) Filed: Dec. 3, 2009

(65) Prior Publication Data

US 2010/0157112 A1    Jun. 24, 2010

(30) Foreign Application Priority Data

Dec. 19, 2008  (JP) ................. 2008-324221

(51) Int. Cl.
*H04N 9/68* (2006.01)
*H04N 5/202* (2006.01)
*G06K 9/00* (2006.01)

(52) U.S. Cl. .................. 348/234; 348/254; 382/167

(58) Field of Classification Search .................. 348/234, 348/242, 253, 254; 382/167
See application file for complete search history.

(56) References Cited

U.S. PATENT DOCUMENTS

| | | | |
|---|---|---|---|
| 7,259,769 B2* | 8/2007 | Diefenbaugh et al. | 345/604 |
| 7,639,292 B2* | 12/2009 | Kwon et al. | 348/243 |
| 8,000,525 B2* | 8/2011 | Kuwahara et al. | 382/167 |
| 2006/0066926 A1* | 3/2006 | Kwak et al. | 358/518 |
| 2006/0256123 A1 | 11/2006 | Miyagi | |
| 2006/0274332 A1 | 12/2006 | Miyagi | |
| 2007/0053607 A1* | 3/2007 | Mitsunaga | 382/274 |
| 2007/0206228 A1 | 9/2007 | Miyagi | |
| 2008/0056566 A1* | 3/2008 | Shehata et al. | 382/167 |
| 2009/0147313 A1 | 6/2009 | Miyagi et al. | |
| 2009/0213429 A1 | 8/2009 | Miyagi | |

FOREIGN PATENT DOCUMENTS

| | | |
|---|---|---|
| JP | 09-200531 | 7/1997 |
| JP | 2748678 | 2/1998 |
| JP | 3134660 | 12/2000 |

OTHER PUBLICATIONS

Abstract of JP 04-150171 published on May 22, 1992.
Abstract of JP 07-288837 published on Oct. 31, 1995.

* cited by examiner

*Primary Examiner* — Trung Diep
(74) *Attorney, Agent, or Firm* — Harness, Dickey & Pierce, P.L.C.

(57) ABSTRACT

An image processing apparatus includes a gamma transforming unit that performs gamma transformation on an image signal based on a luminance component of the image signal and so as to maintain an RGB ratio of the image signal; a correction-target-value calculating unit that calculates a correction target value as a target value for performing tone correction on the luminance component of the image signal, based on a structure of RGB components contained in an image signal obtained by the gamma transforming unit through the gamma transformation; and a tone correcting unit that performs tone correction on a value of the image signal based on the luminance component of the image signal and the correction target value.

15 Claims, 7 Drawing Sheets

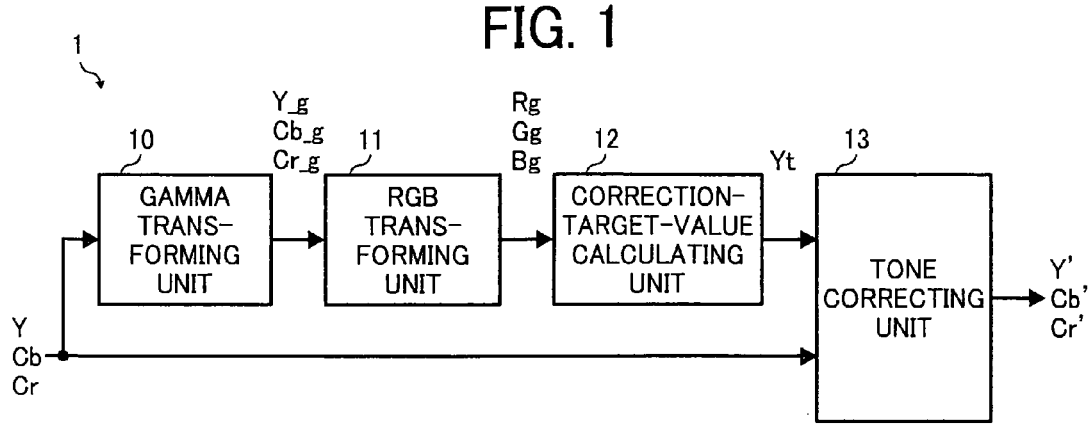
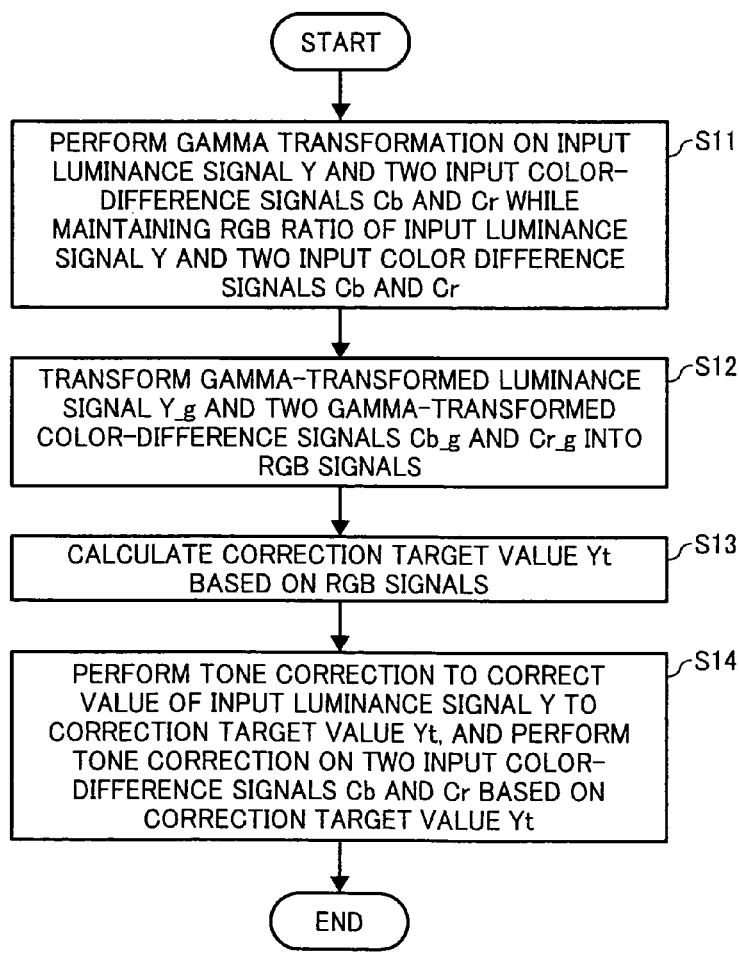

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-324221 filed in Japan on Dec. 19, 2008.

BACKGROUND OF THE INVENTION

1. Field of the Invention

The present invention relates to an image processing apparatus, an image processing method, and a computer program product.

2. Description of the Related Art

When an image is captured by a digital camera, it becomes needed that lightness (brightness) of the image needs to be corrected. More specifically, in some cases, a subject of the image is dark because of underexposure in shooting in a backlight condition or during nighttime, or a part of the image is dark because the image contains a portion that shows shadow. Regarding such an image, for example, brightness of the image has been corrected by allowing a user to specify a correction level or a gamma shape, or automatically created of a gamma table based on features of the image and then gamma transformation is performed. Technologies for correcting an image have been proposed as disclosed in, for example, Japanese Patent No. 2748678, Japanese Patent No. 3134660, and Japanese Patent Application Laid-open No. H9-200531.

More specifically, Japanese Patent No. 2748678 discloses a tone correction method etc. for obtaining R, G, and B tone-corrected output signals such that a luminance signal is created based on R, G, and B signals, gamma transformation is performed on the luminance signal to obtain a desired tone characteristic with an arbitrary shape, and each of the R, G, and B signals is multiplied by a ratio of the gamma-transformed signal to the luminance signal.

Japanese Patent No. 3134660 discloses a color transforming apparatus etc. that includes a primary-color transforming unit that transforms a video signal formed of an input luminance signal and two input color-difference signals into three-primary-color signals; a maximum-value detecting unit that selectively allows a maximum-level output among outputs from the primary-color transforming unit to pass; a reference-value setting unit that sets an acceptable maximum level of the three-primary-color signals; a coefficient determining unit that determines a correction coefficient for limiting a value of the output from the maximum-value detecting unit to be equal to or smaller than a value of the output from the reference-value setting unit, depending on the luminance signal; and a multiplying unit that multiplies each of the two color-difference signals by the correction coefficient. The color transforming apparatus has a feature that an output from the multiplying unit is output as a new color-difference signal.

Japanese Patent Application Laid-open No. H9-200531 discloses an image-brightness transforming apparatus etc. that separates attribute values of brightness and color of an image from an RGB signal of each pixel, and transforms a brightness distribution of a brightness signal. More specifically, the image-brightness transforming apparatus includes a transformation table for brightness transformation, which is calculated from a histogram that represents color-image brightness that is measured through pre-scanning; and a transforming unit that performs the brightness transformation based on the histogram of the brightness signal that has been separated from the RGB signal. The image-brightness transforming apparatus has a feature that the brightness is re-transformed based on characteristics of the histogram.

When the gamma transformation is performed on each of RGB signals to make an image be brighter, as disclosed in Japanese Patent No. 2748678, hue and saturation of the image may be changed. More specifically, in a region on the highlight side (on the maximum brightness side) in which a slope of the gamma shape (gamma characteristics) is smaller than 1, saturation degradation in which an RGB ratio comes close to 1:1:1 may occur.

When the luminance signal and the two color-difference signals are obtained based on performing linear transformation on the RGB signal and the gamma transformation is performed on the luminance signal to make an image be brighter, only a luminance is increased and a color difference is maintained. Therefore, in a region on the shadow side (on the minimum brightness side) in which the slope of the gamma shape (gamma characteristics) is larger than 1, the degree of correction increases, so that the saturation degradation in which the RGB ratio comes close to 1:1:1 remarkably occurs.

Regarding the above-mentioned points, according to the technology disclosed in Japanese Patent No. 2748678, the brightness can be adjusted without changing the hue and the saturation. However, in the technology disclosed in Japanese Patent No. 2748678, as mentioned in Japanese Patent No. 3134660, color obtained after the tone correction may be saturated depending on color present before the tone correction. If such a situation occurs, a luminance level obtained after the tone correction remains smaller than a desired luminance level, and the hue and the saturation are also changed.

On the other hand, according to the technology disclosed in Japanese Patent No. 3134660, the correction coefficient for the color-difference signals is limited to prevent occurrence of saturation in color reproduction, so that a luminance correction can be performed to conform to a desired gamma characteristics.

In the sRGB color space that is a color space used in a typical monitor, each of RGB signals is limited (normalized) to a range from 0 to 1. In the sYCC color space that is used in images captured by a typical digital camera, color is represented by a luminance signal Y and color-difference signals Cb and Cr. While the sYCC color space and the sRGB color space can be linearly transformed from one to the other, the sYCC color space can express a wider range of colors than the sRGB color space. However, because the monitor employs the sRGB color space, when an image captured by the digital camera is displayed on the monitor, only colors in a range that can be expressed in the sRGB color space are displayable, so that each of the RGB signals is to be limited to the range from 0 to 1.

The following Equations (1) to (3) are used as Equations for calculating YCbCr signals from RGB signals.

$$Y = 0.2990 \times R + 0.5870 \times G + 0.1140 \times B \tag{1}$$

$$Cb = -0.1687 \times R - 0.3312 \times G + 0.5000 \times B \tag{2}$$

$$Cr = 0.5000 \times R - 0.4187 \times G - 0.0813 \times B \tag{3}$$

Further, the following Equations (4) to (6) are used as Equations for calculating RGB signals from YCbCr signals.

$$R = Y + 1.4020 \times Cr \tag{4}$$

$$G = Y - 0.3441 \times Cb - 0.7141 \times Cr \tag{5}$$

$$B = Y + 1.7720 \times Cr \tag{6}$$

Meanwhile, when the brightness is corrected by applying a single gamma table to the entire portion of a single image, there is a case that correction may not be performed as desired by a user. For example, when an image shows a night scene containing a red light sign board, there may be a case that a user wants to perform correction to make only a dark portion having low visibility be brighter and does not want to perform correction on a red light sign board portion having good visibility. In such a situation, if the single gamma table is uniformly applied to the entire portion of the single image, the red light sign board portion is corrected to be brighter while the portion having the low visibility is corrected to be brighter. Accordingly, red in the light sign board portion becomes a whitish faded color, resulting in decreased quality of the image. To perform correction on such an image as desired by a user, one possible measure is to locally change a gamma table in a single image by identifying color or peripheral information (scene etc.). However, in this measure, the following concerns may easily be raised: discontinuous tone may appear because of the change of the gamma table; and an amount of information processing may increase because of a reference to the peripheral information.

SUMMARY OF THE INVENTION

It is an object of the present invention to at least partially solve the problems in the conventional technology.

According to an aspect of the present invention there is provided an image processing apparatus including: a gamma transforming unit that performs gamma transformation on an image signal based on a luminance component of the image signal so as to maintain an RGB ratio of the image signal; a correction-target-value calculating unit that calculates a correction target value as a target value for performing tone correction on the luminance component of the image signal, based on a structure of RGB components contained in an image signal obtained by the gamma transforming unit through the gamma transformation; and a tone correcting unit that performs tone correction on a value of the image signal based on the luminance component of the image signal and the correction target value.

According to another aspect of the present invention there is provided an image processing method for an image processing apparatus including: gamma-transforming that performs gamma transformation on an image signal based on a luminance component of the image signal so as to maintain an RGB ratio of the image signal; calculating that calculates a correction target value as a target value for performing tone correction on the luminance component of the image signal, based on a structure of RGB components contained in an image signal obtained at the gamma-transforming; and tone-correcting that performs tone correction on a value of the image signal based on the luminance component of the image signal and the correction target value.

According to still another aspect of the present invention there is provided a computer program product including a computer-usable medium having computer-readable program codes embodied in the medium for image processing in an image forming apparatus, the program codes when executed causing a computer to execute: gamma-transforming that performs gamma transformation on an image signal based on a luminance component of the image signal so as to maintain an RGB ratio of the image signal; calculating that calculates a correction target value as a target value for performing tone correction on the luminance component of the image signal, based on a structure of RGB components contained in an image signal obtained at the gamma-transforming; and tone-correcting that performs tone correction on a value of the image signal based on the luminance component of the image signal and the correction target value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a configuration of an image processing apparatus according to a first embodiment of the present invention;

FIG. 2 is a flowchart of an image processing process performed by the image processing apparatus according to the first embodiment;

DETAILED DESCRIPTION OF THE PREFERRED EMBODIMENTS

Figure 3:
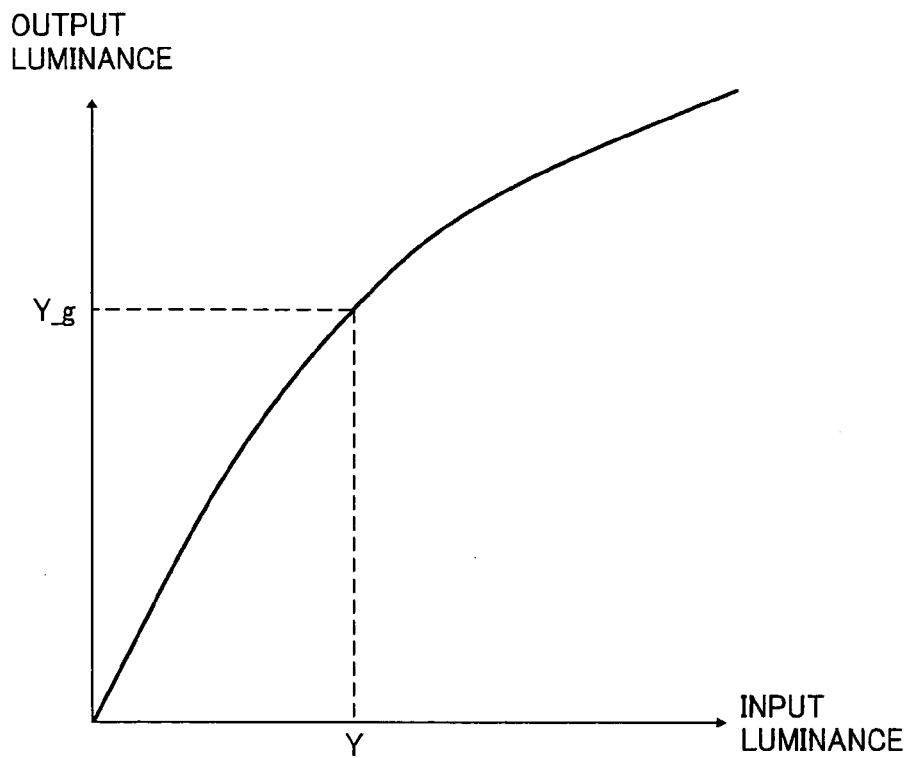
FIG. 3 is a diagram illustrating an example of gamma transformation characteristics of a gamma table stored in a gamma transforming unit shown in FIG. 1.

Exemplary embodiments of an image processing apparatus, an image processing method, and a computer program product according to the present invention are explained in detail below with reference to the accompanying drawings.

FIG. 1 is a block diagram of a configuration of an image processing apparatus according to a first embodiment of the present invention. An image processing apparatus 1 shown in FIG. 1 performs image processing on an input luminance signal Y and two input color-difference signals Cb and Cr in the YCbCr color space and outputs an output luminance signal Y' and two output color-difference signals Cb' and Cr' in the YCbCr color space.

The image processing apparatus 1 includes a gamma transforming unit 10 as a gamma transforming means of the present invention, an RGB transforming unit 11, a correction-target-value calculating unit 12 as a correction-target-value calculating means of the present invention, and a tone correcting unit 13 as a tone correcting means of the present invention.

An image processing process performed by the image processing apparatus 1 is described below. FIG. 2 is a flowchart of the image processing process performed by the image processing apparatus 1.

The gamma transforming unit 10 performs gamma transformation on an YCbCr-color-space input signal (Y, Cb, Cr) and outputs an YCbCr-color-space output signal (Y_g, Cb_g, Cr_g) obtained by the gamma transformation (Step S11).

More specifically, the gamma transforming unit 10 stores therein a single gamma table having gamma transformation characteristics as illustrated in FIG. 3, and reads out, as the output luminance signal Y_g, a value that is stored at an address corresponding to the input luminance signal Y in the gamma table.

Besides, the gamma transforming unit 10 calculates a luminance correction ratio by that is a ratio of the output luminance signal Y_g to the input luminance signal Y according to the following Equation.

$$bp = Y\_g/Y \quad (7)$$

Then, the gamma transforming unit 10 calculates the two output color-difference signals CB_g and Cr_g by multiplying the luminance correction ratio by the two input color-difference signals Cb and Cr, respectively, according to the following Equations.

$$Cb\_g = bp \times Cb \quad (8)$$

$$Cr\_g = bp \times Cr \quad (9)$$

In this manner, the YCbCr-color-space output signal (Y_g, Cb_g, Cr_g) output from the gamma transforming unit 10 corresponds to a result of multiplication of the YCbCr-color-space input signal (Y, Cb, Cr) by the luminance correction ratio bp. As represented by Equations (1) to (6), the RGB color space and the YCbCr color space are linearly transformable from one to the other, so that multiplication of the YCbCr-color-space input signal (Y, Cb, Cr) by the luminance correction ratio by corresponds to multiplication of an RGB signal (R, G, B), which is obtained by performing linear transformation on the YCbCr-color-space input signal (Y, Cb, Cr), by the luminance correction ratio bp. Thus, the gamma transforming unit 10 performs gamma transformation on the YCbCr-color-space input signal (Y, Cb, Cr) while maintaining an RGB ratio of the YCbCr-color-space input signal (Y, Cb, Cr). In other words, the RGB ratio of the YCbCr-color-space input signal (Y, Cb, Cr) is equal to an RGB ratio of the YCbCr-color-space output signal (Y_g, Cb_g, Cr_g) output from the gamma transforming unit 10.

Referring back to FIG. 2, the RGB transforming unit 11 transforms the YCbCr-color-space output signal (Y_g, Cb_g, Cr_g) that has been output from the gamma transforming unit 10 into an RGB-color-space signal (Rg, Gg, Bg) by using Equations (4) to (6) (Step S12).

Then, the correction-target-value calculating unit 12 calculates a correction target value Yt, which is used as a target value for performing tone correction on the input luminance signal in the YCbCr color space, based on the RGB-color-space signal (Rg, Gg, Bg) output from the RGB transforming unit 11, and then outputs the correction target value Yt (Step S13).

Figure 4:
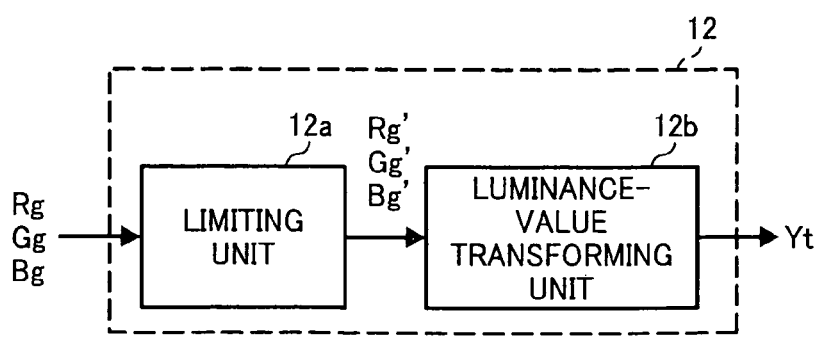
FIG. 4 is a schematic diagram of an exemplary configuration of a correction-target-value calculating unit shown in FIG. 1.

FIG. 4 is a block diagram of an exemplary internal configuration of the correction-target-value calculating unit 12. As shown in FIG. 4, the correction-target-value calculating unit 12 includes a limiting unit 12a as a limiting means of the present invention and a luminance-value transforming unit 12b as a luminance-value transforming means.

The limiting unit 12a outputs an RGB-color-space signal (Rg', Gg', Bg') that is obtained by limiting a value of the RGB-color-space signal (Rg, Gg, Bg) output from the RGB transforming unit 11 to a range from 0 to 1. A limitation process performed by the limiting unit 12a can be represented as follows.

$$Rg' = \text{Max}(0, \text{Min}(Rg, 1)) \quad (10)$$

$$Gg' = \text{Max}(0, \text{Min}(Gg, 1)) \quad (11)$$

$$Bg' = \text{Max}(0, \text{Min}(Bg, 1)) \quad (12)$$

In case of a digital signal in which each of RGB components is represented by 8 bits (an arbitrary value in a range from 0 to 255 can be set), an upper limit value of each of the RGB components becomes 255. In this case, the limiting unit 12a performs the limitation process so that a value of a component that exceeds 255 among components of the RGB-color-space signal (Rg, Gg, Bg) output from the RGB transforming unit 11 is corrected to 255.

When each of the components of the RGB-color-space signal (Rg, Gg, Bg) output from the RGB transforming unit 11 is in a range from 0 to 1, the limiting unit 12a can directly output, as the signal (Rg', Gg', Bg'), the signal (Rg, Gg, Bg) output from the RGB transforming unit 11.

The luminance-value transforming unit 12b calculates an YCbCr-color-space luminance signal based on the RGB-color-space signal (Rg', Gg', Bg') output from the limiting unit 12a by using Equation (1), and outputs a value of the luminance signal as the correction target value Yt. Only when the limiting unit 12a performs the limitation process and one of the following results, i.e., Rg'≠Rg, Gg'≠Gg, and Bg'≠Bg, is obtained, the result is such that Yt≠Y_g, so that a correction target value that is changed so as not to conform to the gamma table of the gamma transforming unit 10 will be set. On the other hand, when the limiting unit 12a does not actually perform the limitation process, (i.e. when Rg'=Rg, Gg'=Gg, and Bg'=Bg), the result is such that Yt=Y_g, so that a correction target value that conforms to the gamma table of the gamma transforming unit 10 will be set.

Referring back to FIG. 2, the tone correcting unit 13 performs tone correction on the YCbCr-color-space input signal (Y, Cb, Cr) based on the correction target value Yt output from the correction-target-value calculating unit 12, and outputs an YCbCr-color-space signal (Y', Cb', Cr') that are obtained by the tone correction (Step S14).

Figure 5:
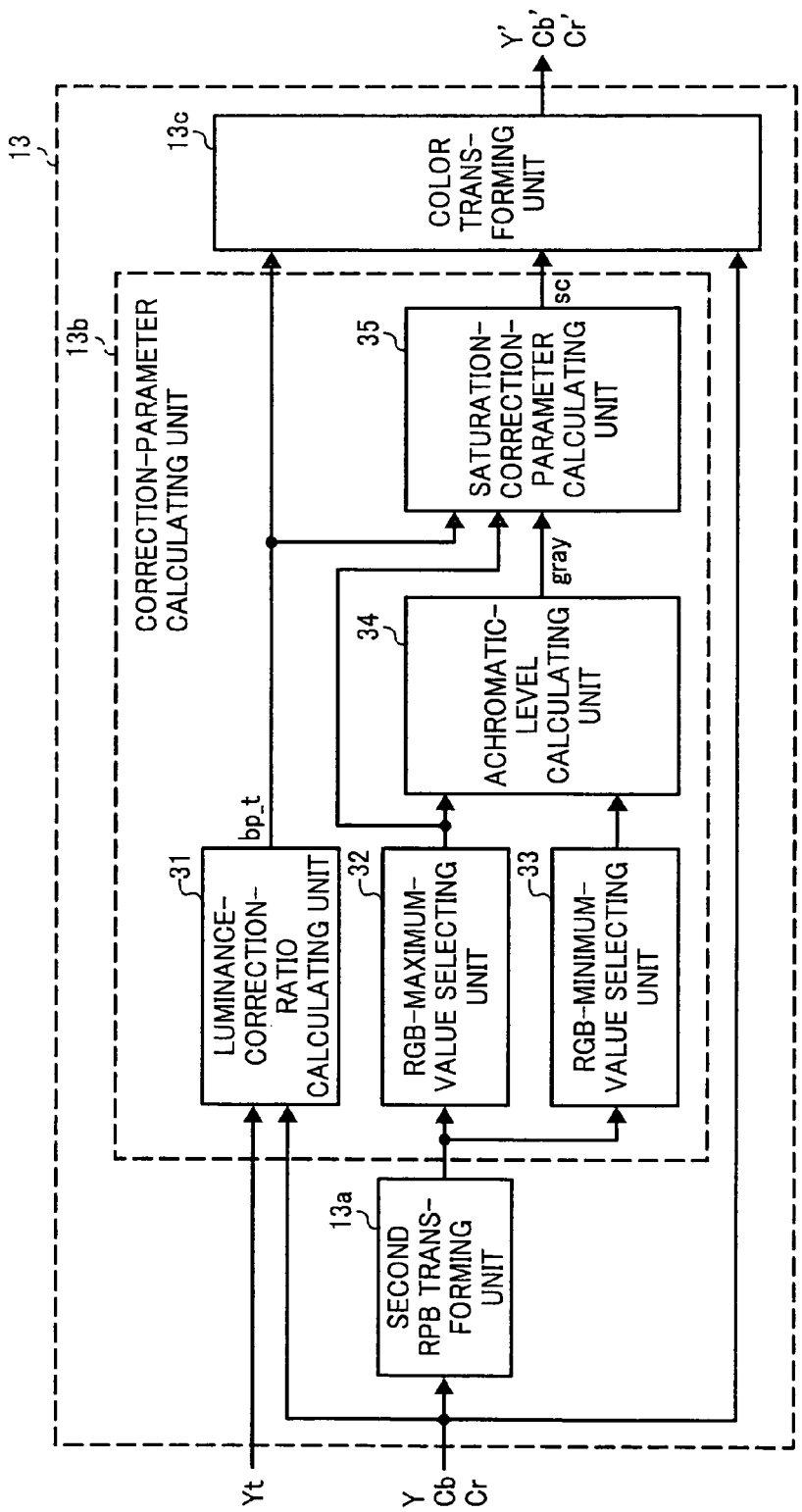
FIG. 5 is a schematic diagram of an exemplary configuration of a tone correcting unit shown in FIG. 1.

FIG. 5 is a block diagram of an exemplary internal configuration of the tone correcting unit 13. As shown in FIG. 5, the tone correcting unit 13 includes a second RGB transforming unit 13a, a correction-parameter calculating unit 13b as a correction-parameter calculating means of the present invention, and a color transforming unit 13c as a color transforming means of the present invention.

The correction-parameter calculating unit 13b includes a luminance-correction-ratio calculating unit 31, an RGB-maximum-value selecting unit 32 as an RGB-maximum-value selecting means of the present invention, an RGB-minimum-value selecting unit 33, an achromatic-level calculating unit 34 as an achromatic-level calculating means of the present invention, and a saturation-correction-parameter calculating unit 35.

The second RGB transforming unit 13a transforms the YCbCr-color-space input signal (Y, Cb, Cr) into a second RGB signal by using Equations (4) to (6).

The luminance-correction-ratio calculating unit 31 calculates a luminance correction ratio for performing tone correction to correct the input luminance signal Y to the correction target value Yt, that is, calculates a luminance correction ratio bp_t that is a ratio of the correction target value Yt to the input luminance signal Y, according to the following Equation.

$$bp\_t = Yt/Y \quad (13)$$

The RGB-maximum-value selecting unit 32 selects a maximum component Max(R, G, B) from components of the second RGB signal (R, G, B) output from the second RGB transforming unit 13a, and outputs the maximum component Max(R, G, B).

The RGB-minimum-value selecting unit 33 selects a minimum component Min(R, G, B) from the components of the second RGB signal (R, G, B) output from the second RGB transforming unit 13a, and outputs the minimum component Min(R, G, B).

The achromatic-level calculating unit 34 calculates an achromatic level "gray" that represents how much degree a color that is expressed by the input luminance signal and the two input color-difference signals is close to an achromatic color, based on a value Max(R, G, B) output from the RGB-maximum-value selecting unit 32, a value Min(R, G, B) output from the RGB-minimum-value selecting unit 33, and two thresholds GRAY_TH1 and GRAY_TH2 that are set in advance. It is assumed here that as a value of the achromatic level "gray" comes close to 1, a corresponding color comes close to the achromatic color, and as the value of the achromatic level "gray" comes close to 0, a corresponding color comes close to the chromatic color.

More specifically, the achromatic-level calculating unit 34 calculates an absolute value F of a difference between the value Max(R, G, B) output from the RGB-maximum-value selecting unit 32 and the value Min(R, G, B) output from the RGB-minimum-value selecting unit 33. The absolute value F can be represented by the following Equation.

$$F = |\text{Max}(R,G,B) - \text{Min}(R,G,B)| \quad (14)$$

When F<GRAY_TH1, the achromatic-level calculating unit 34 determines that the YCbCr-color-space input signal (Y, Cb, Cr) corresponds to an achromatic-color pixel signal, and determines as follows.

$$\text{gray} = 1 \quad (15)$$

When GRAY_TH1≦F<GRAY_TH2, the achromatic-level calculating unit 34 determines that the YCbCr-color-space input signal (Y, Cb, Cr) corresponds to an intermediate-chromatic pixel signal, and calculates "gray" according to the following Equation.

$$\text{gray} = (F - \text{GRAY\_}TH2)/(\text{GRAY\_}TH1 - \text{GRAY\_}TH2) \quad (16)$$

When F≧GRAY_TH2, the achromatic-level calculating unit 34 determines that the YCbCr-color-space input signal (Y, Cb, Cr) corresponds to a chromatic-color pixel signal, and determines as follows.

$$\text{gray} = 0 \quad (17)$$

The reason why the achromatic-level calculating unit 34 sequentially changes the achromatic level "gray" (calculates a value to be in a range from 0 to 1 based on the absolute value F) when GRAY_TH1≦F<GRAY_TH2 (i.e., when the YCbCr-color-space input signal (Y, Cb, Cr) is determined as the intermediate-chromatic pixel signal) is to prevent the following situation: a saturation gap may occur in an image obtained after the tone correction (i.e., an image output from the image processing apparatus 1) because a saturation correction parameter, which is calculated based on the achromatic level "gray" by the saturation-correction-parameter calculating unit 35 in a subsequent processing stage, changes sharply at a boundary between the achromatic color and the chromatic color.

Calculation of the achromatic level "gray" by the achromatic-level calculating unit 34 is aimed at the following. That is, a color noise component that is slightly colored when viewed in units of pixel may be contained even in an achromatic color region, and if correction processing is performed on the color noise component with use of the same color-difference correction ratio as that for a chromatic color region, the color noise component becomes highly visible, resulting in decreased quality of the image. Therefore, the achromatic-level calculating unit 34 calculates the achromatic level "gray" so that the saturation-correction-parameter calculating unit 35 in the subsequent stage can control the color-difference correction ratio for a color that is close to the achromatic color by using the achromatic level "gray" and saturation of the color noise component in the achromatic color region is not amplified when the image is corrected to be brighter.

The thresholds GRAY_TH1 and GRAY_TH2 used for the calculation of the achromatic level "gray" can be set in advance by inputting a plurality of image samples into the image processing apparatus 1 and evaluating visibility of noise in an image obtained after the tone correction (i.e., an image output from the image processing apparatus 1). According to the experiment made by the inventors of the present invention, it is preferable to set such that GRAY_TH1=0.05 or so and GRAY_TH2=0.12 or so.

The saturation-correction-parameter calculating unit 35 calculates a saturation correction parameter sc that is used for performing color transformation (tone correction) on the input color-difference signals Cb and Cr in the YCbCr color space by the color transforming unit 13c in a subsequent stage, based on the luminance correction ratio bp_t output from the luminance-correction-ratio calculating unit 31, the value Max(R, G, B) output from the RGB-maximum-value selecting unit 32, and the achromatic level "gray" output from the achromatic-level calculating unit 34.

More specifically, the saturation-correction-parameter calculating unit 35 calculates a value sc_p1 based on the value Max(R, G, B) output from the RGB-maximum-value selecting unit 32, according to the following Equation.

$$sc\_p1 = \text{Max}(R,G,B)/2.5 \quad (18)$$

Then, the saturation-correction-parameter calculating unit 35 compares the value sc_p1 with a threshold sc_p2 that is set in advance. When sc_p1>sc_p2, the saturation-correction-parameter calculating unit 35 calculates a value sc_p according to the following Equation.

$$sc\_p = (sc\_p2 - sc\_p1) \times \text{gray} + sc\_p1 \quad (19)$$

When sc_p1≦sc_p2, the saturation-correction-parameter calculating unit 35 calculates the value sc_p according to the following Equation.

$$sc\_p = sc\_p1 \quad (20)$$

In Equation (19), when gray=1 (i.e., when an input signal (Y, Cb, Cr) is the achromatic-color pixel signal), the result is such that sc_p=sc_p2, so that the threshold sc_p2 functions as a parameter for the achromatic color region. Therefore, similarly to the thresholds GRAY_TH1 and GRAY_TH2, the threshold sc_p2 can be set in advance by inputting a plurality of image samples into the image processing apparatus 1 and evaluating visibility of noise in an image obtained after the tone correction (i.e., an image output from the image processing apparatus 1). According to the experiment made by the inventors of the present invention, it is preferable to set such that sc_p2=0.16 or so.

The reason why the value Max(R, G, B) is used in Equation (18) is to calculate the saturation correction parameter sc based on the value Max(R, G, B) and to prevent a situation in which hue and saturation are changed because of occurrence of saturation in a range from an intermediate concentration region to a highlight region, in which the value Max(R, G, B) is relatively large.

Then, the saturation-correction-parameter calculating unit 35 calculates the saturation correction parameter sc based on the value sc_p and the luminance correction ratio bp_t that is output from the luminance-correction-ratio calculating unit 31, according to the following Equation.

$$sc=(1-bp\_t) \times sc\_p \quad (21)$$

The color transforming unit 13c performs color transformation (tone correction) processing on the YCbCr-color-space input signal (Y, Cb, Cr) based on the luminance correction ratio bp_t output from the luminance-correction-ratio calculating unit 31 and the saturation correction parameter sc output from the saturation-correction-parameter calculating unit 35, and then outputs the YCbCr-color-space signal (Y', Cb', Cr').

More specifically, the color transforming unit 13c calculates Y', Cb', and Cr' according to the following Equations.

$$Y'=Yt(=bp\_t \times Y) \quad (22)$$

$$Cb'=bp\_tx(1+sc) \times Cb \quad (23)$$

$$Cr'=bp\_tx(1+sc) \times Cr \quad (24)$$

When the luminance correction ratio is bp_t, a color-difference correction ratio is bp_tx(1+sc). The color-difference correction ratio bp_tx(1+sc) is indirectly controlled by the value Max(R, G, B) and the achromatic level "gray" that are used in the calculation of the saturation correction parameter sc, as shown in FIGS. 6 and 7.

Figure 6:
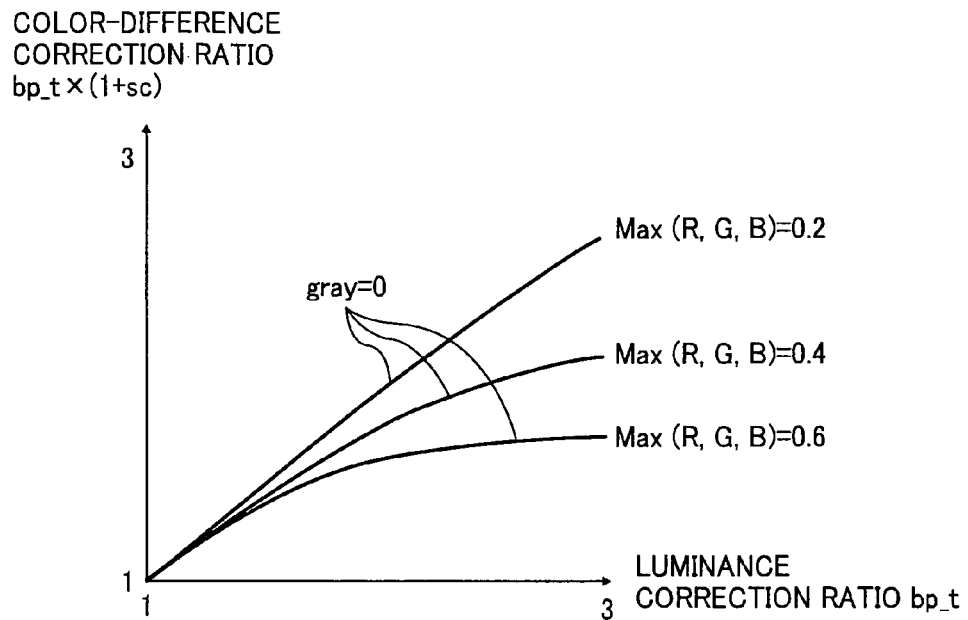
FIG. 6 is a diagram illustrating an example of a relationship between a luminance correction ratio and a color-difference correction ratio of the image processing apparatus according to the first embodiment.

FIG. 6 is a diagram in which the luminance correction ratio bp_t is represented on the horizontal axis and the color-difference correction ratio bp_tx(1+sc) is represented on the vertical axis for each value Max(R, G, B) when the achromatic color level is such that gray=0 (i.e., when the input signal is the chromatic-color pixel signal). In FIG. 6, the following three cases are illustrated: Max(R, G, B)=0.2, Max(R, G, B)=0.4, and Max(R, G, B)=0.6. As shown in FIG. 6, as the luminance correction ratio bp_t increases, the color-difference correction ratio bp_tx(1+sc) increases. Furthermore, the color-difference correction ratio bp_tx(1+sc) becomes relatively large in a shadow region in which Max(R, G, B) remains small, and the color-difference correction ratio bp_tx(1+sc) decreases as Max(R, G, B) increases so that occurrence of saturation can be prevented.

In other words, the saturation-correction-parameter calculating unit 35 calculates the saturation correction parameter sc so that the saturation correction parameter sc increases as the luminance correction ratio bp_t increases. Furthermore, the saturation-correction-parameter calculating unit 35 calculates the saturation correction parameter sc so that the saturation correction parameter sc becomes relatively large in the shadow region in which Max(R, G, B) remains small, and the saturation correction parameter sc decreases (is suppressed) as Max(R, G, B) increases so that occurrence of saturation can be prevented.

Figure 7:
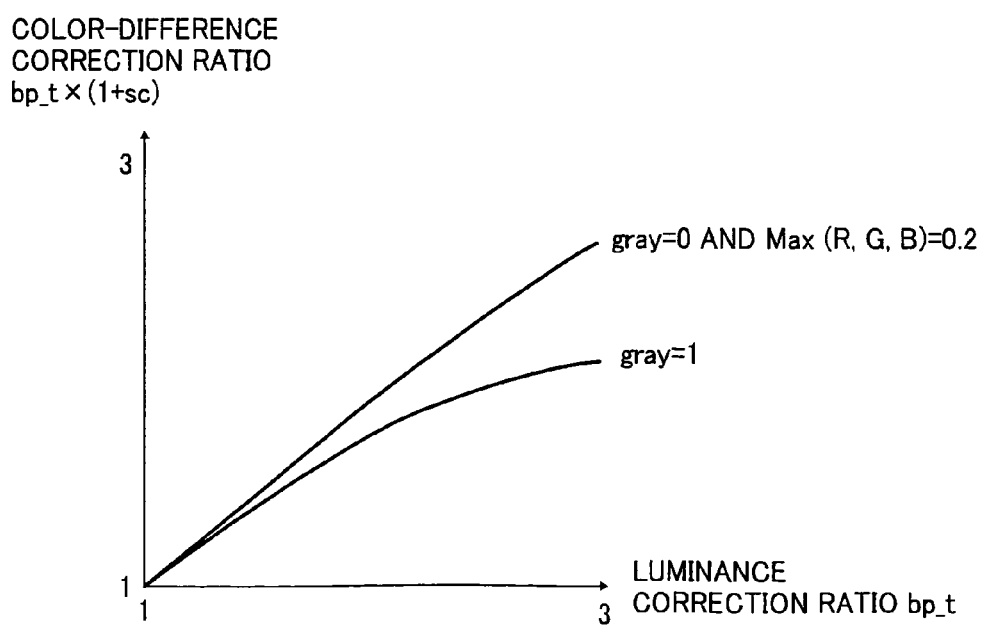
FIG. 7 is a diagram illustrating an example of a relationship between the luminance correction ratio and the color-difference correction ratio of the image processing apparatus according to the first embodiment.

FIG. 7 is a diagram in which the luminance correction ratio bp_t is represented on the horizontal axis and the color-difference correction ratio bp_tx(1+sc) is represented on the vertical axis for each achromatic color level "gray" when the value Max(R, G, B) is maintained at the same value (here, when Max(R, G, B)=0.2). In FIG. 7, the following two cases are illustrated: the achromatic level is such that gray=0, and the achromatic level is such that gray=1. As shown in FIG. 7, as the luminance correction ratio bp_t increases, the color-difference correction ratio bp_tx(1+sc) increases. Further, under a condition where the color-difference correction ratio is relatively large while the input signal corresponds to the chromatic-color pixel signal (when gray=0), the color-difference correction ratio comes close (decreases) to the color-difference correction ratio that is obtained when the input signal corresponds to the achromatic-color pixel signal (when gray=1) with increase in the value of the achromatic level "gray", so that the value of the color-difference correction ratio bp_tx(1+sc) can be suppressed.

In other words, the saturation-correction-parameter calculating unit 35 calculates the saturation correction parameter sc so that the saturation correction parameter sc increases as the luminance correction ratio bp_t increases. Furthermore, the saturation-correction-parameter calculating unit 35 calculates the saturation correction parameter sc so that the saturation correction parameter sc decreases (is suppressed) as the achromatic level "gray" increases.

As described above, according to the present embodiment, the gamma transforming unit 10 calculates the signal (Y_g, Cb_g, Cr_g) by performing the gamma transformation on each of the input luminance signal Y and the two input color-difference signals Cb and Cr while maintaining the RGB ratio, the RGB transforming unit 11 transforms the signal (Y_g, Cb_g, Cr_g) into the RGB-color-space signal (Rg, Gg, Bg), the correction-target-value calculating unit 12 calculates the correction target value Yt based on the signal (Rg, Gg, Bg), and the tone correcting unit 13 performs the tone correction to correct the input luminance signal Y to the correction target value Yt and then performs the tone correction to correct a value of each of the two input color-difference signals Cb and Cr based on the correction target value Yt. Therefore, while a simple configuration in which a singe gamma table is used for a single image can be maintained, it is possible to prevent a situation in which a region containing a high-brightness chromatic color, such as red or blue, is corrected to contain a faded color, and, it is also possible to perform brightness correction so that change in hue and saturation in other regions can be suppressed.

Furthermore, the limiting unit 12a outputs the signal (Rg', Gg', Bg') obtained by limiting each value of the signal (Rg, Gg, Bg) to be equal to or smaller than a predetermined value, and the luminance-value transforming unit 12b calculates the correction target value Yt based on the signal (Rg', Gg', Bg'). Therefore, while a simple configuration in which a single gamma table is used for a single image can be maintained, it is possible to locally set, in an image, the correction target value to an appropriate value that is different from a value set in the gamma table.

Moreover, the saturation-correction-parameter calculating unit 35 calculates the saturation correction parameter sc such that the saturation correction parameter sc decreases with increase in the maximum value Max(R, G, B) of the components of the second RGB signal that are obtained by transforming the input luminance signal Y and the two input color-difference signals Cb and Cr into the RGB-color-space signals, respectively, so that the color-difference correction ratio bp_tx(1+sc) that is calculated by the color transforming unit 13c cab be controlled. Therefore, it is possible to perform brightness correction so that change in hue and saturation, which is caused by occurrence of saturation in the intermediate concentration region to the highlight region, can be suppressed.

Furthermore, the saturation-correction-parameter calculating unit 35 calculates the saturation correction parameter sc such that the saturation correction parameter sc decreases as the achromatic level "gray" increases, so that the color-difference correction ratio bp_t×(1+sc) that is calculated by the color transforming unit 13c can be controlled. Therefore, it is possible to perform brightness correction so that amplification of a color noise component in the achromatic color region can be suppressed.

Figure 8:
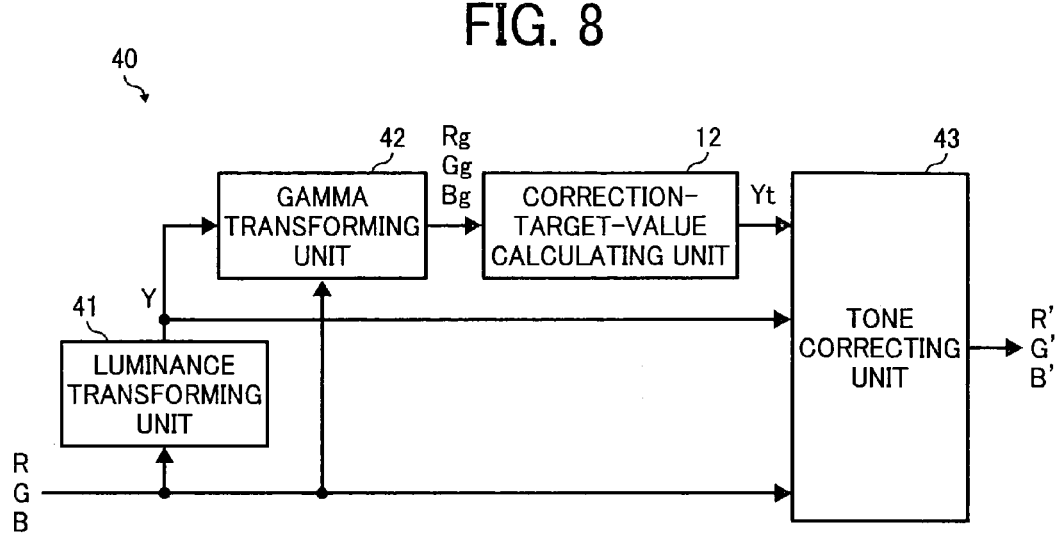
FIG. 8 is a block diagram of a configuration of an image processing apparatus according to a second embodiment of the present invention.

FIG. 8 is a block diagram of a configuration of an image processing apparatus according to a second embodiment of the present invention. An image processing apparatus 40 shown in FIG. 8 performs image processing on RGB-color-space input signals R, G, and B and outputs respective RGB-color-space output signals R', G', and B'.

The image processing apparatus 40 shown in FIG. 8 includes a luminance transforming unit 41, a gamma transforming unit 42 as the gamma transforming means of the present invention, the correction-target-value calculating unit 12 as the correction-target-value calculating means of the present invention, and a tone correcting unit 43 as the tone correcting means of the present invention. In the following descriptions, the same components as those of the first embodiment are denoted with the same reference numerals and the explanation thereof is omitted. The correction-target-value calculating unit 12 of the second embodiment is the same as that of the first embodiment, and therefore, explanation thereof is also omitted.

Figure 9:
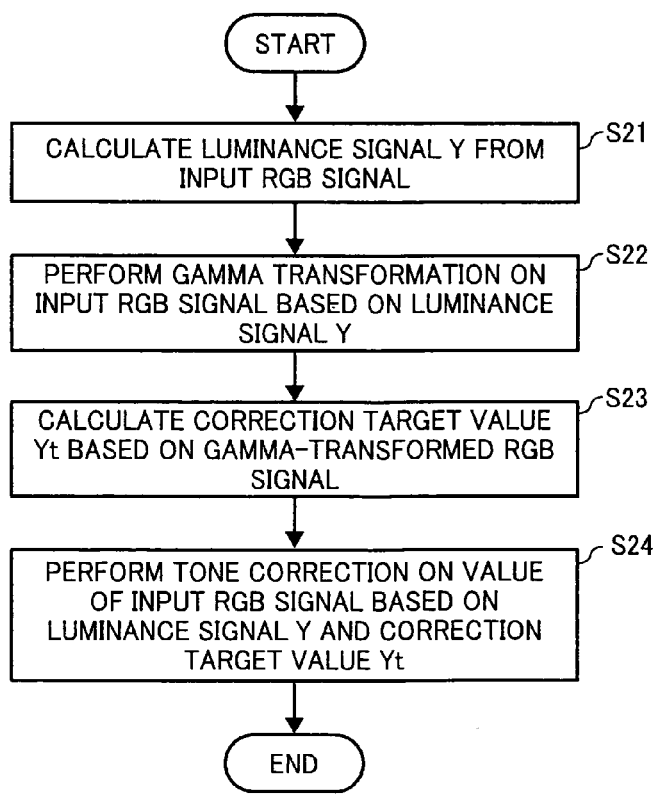
FIG. 9 is a flowchart of an image processing process performed by the image processing apparatus according to the second embodiment.

An image processing process performed by the image processing apparatus 40 is described below. FIG. 9 is a flowchart of the image processing process performed by the image processing apparatus 40.

The luminance transforming unit 41 calculates a luminance signal Y in the YCbCr color space from the input RGB signal (R, G, B) by using Equation (1), and outputs the luminance signal Y (Step S21).

Then, the gamma transforming unit 42 performs gamma transformation on the input RGB signal (R, G, B) based on the luminance signal Y output from the luminance transforming unit 41, and outputs RGB color-space signal (Rg, Gg, Bg) obtained by the gamma transformation (Step S22).

More specifically, the gamma transforming unit 42 stores therein a single gamma table having gamma transformation characteristics as illustrated in FIG. 3, and reads out, as the output luminance signal Y_g, a value that is stored at an address corresponding to the input luminance signal Y in the gamma table.

Besides, the gamma transforming unit 42 calculates a luminance correction ratio by that is a ratio of the output luminance signal Y_g to the input luminance signal Y according to the following Equation.

$$bp = Y\_g/Y \tag{25}$$

Then, the gamma transforming unit 42 calculates the RGB signal (Rg, Gg, Bg) by multiplying the luminance correction ratio by the input RGB signal (R, G, B) according to the following Equations, and outputs the RGB signal (Rg, Gg, Bg).

$$Rg = bp \times R \tag{26}$$

$$Gg = bp \times G \tag{27}$$

$$Bg = bp \times B \tag{28}$$

In this manner, the RGB signal (Rg, Gg, Bg) output from the gamma transforming unit 42 respectively correspond to results of the multiplication of the input RGB signal (R, G, B) by the luminance correction ratio bp. Therefore, the gamma transforming unit 42 performs the gamma transformation on the input RGB signal (R, G, B) while maintaining RGB ratio of the input RGB signal (R, G, B). In other words, the RGB ratio of the input RGB signal (R, G, B) is equal to the RGB ratio of the RGB signal (Rg, Gg, Bg) output from the gamma transforming unit 42.

Referring back to FIG. 9, the correction-target-value calculating unit 12 calculates the correction target value Yt, which is used as a target value for performing tone correction on the input luminance signal in the YCbCr color space, based on the RGB-color-space signal (Rg, Gg, Bg) output from the gamma transforming unit 42, and then outputs the correction target value Yt (Step S23).

Then, the tone correcting unit 43 performs tone correction on the input RGB signal (R, G, B) based on the correction target value Yt output from the correction-target-value calculating unit 12, and outputs RGB-color-space signal (R', G', B') that are obtained by the tone correction (Step S24).

Figure 10:
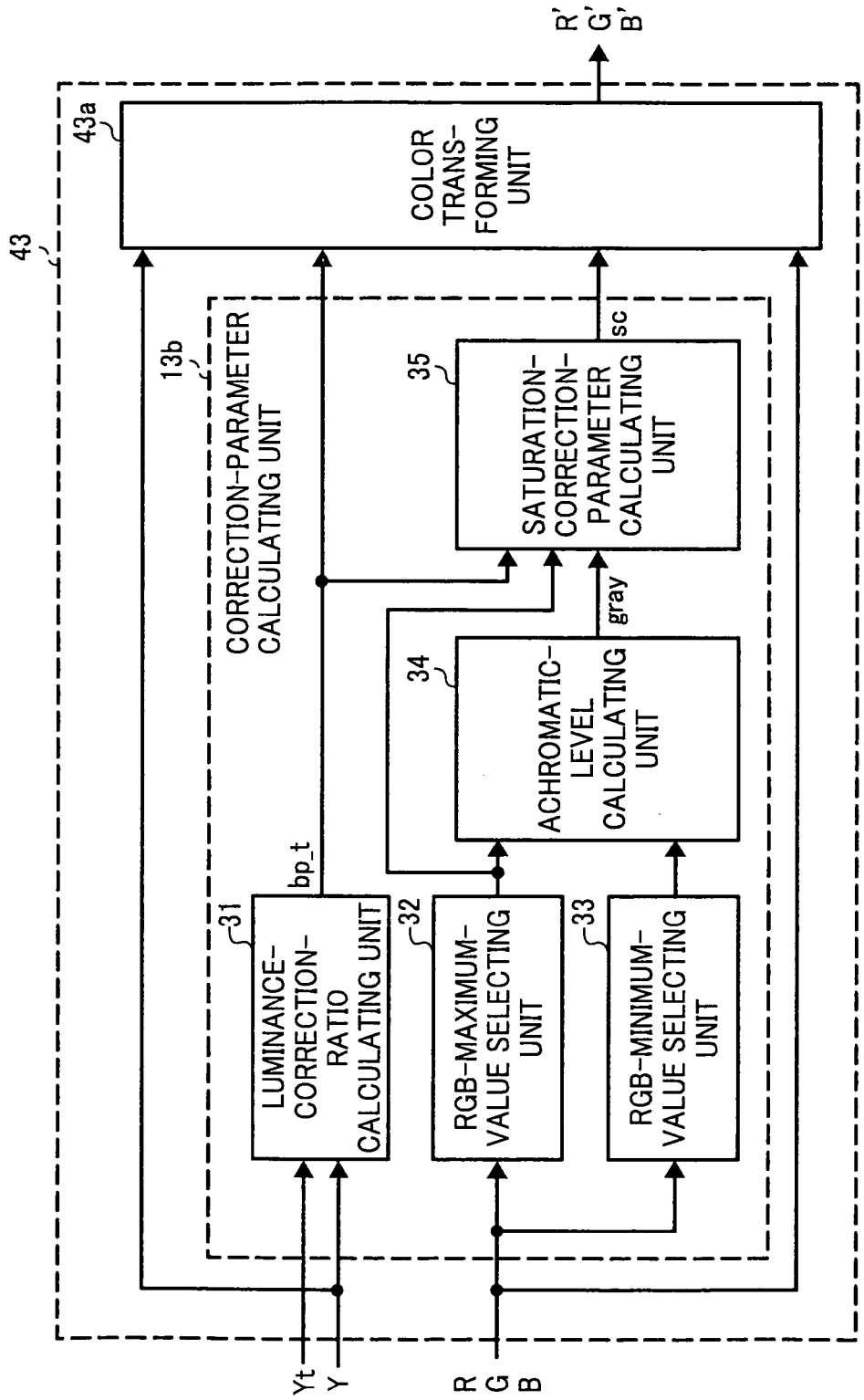
FIG. 10 is a schematic diagram of an exemplary configuration of a tone correcting unit shown in FIG. 8.

FIG. 10 is a block diagram of an exemplary internal configuration of the tone correcting unit 43. As shown in FIG. 10, the tone correcting unit 43 includes the correction-parameter calculating unit 13b as the correction-parameter calculating means of the present invention and a color transforming unit 43a as the color transforming means of the present invention. The correction-parameter calculating unit 13b of the second embodiment is the same as that of the first embodiment, and therefore, explanation thereof is omitted.

The color transforming unit 43a performs color transformation (tone correction) on the input RGB signal (R, G, B) based on the luminance correction ratio bp_t output from the luminance-correction-ratio calculating unit 31 and the saturation correction parameter sc output from the saturation-correction-parameter calculating unit 35, and then outputs the RGB signal (R', G', B').

While, in the first embodiment, as represented by Equations (22) to (24), color transformation is performed on each of the input luminance signal Y and the two input color-difference signals Cb and Cr on assumption that the color-difference correction ratio is represented as bp_t×(1+sc) with respect to the luminance correction ratio by t, the same color transformation can be performed on the input RGB signal. Equations (22) to (24) can be converted into the following Equations, respectively, as color transformation Equations for the RGB signal, by using a relationship between the RGB color space and the YCbCr color space as represented by Equations (1) to (6).

$$R' = bp\_t \times R + sc \times bp\_t \times (R-Y) \tag{29}$$

$$G' = bp\_t \times G + sc \times bp\_t \times (G-Y) \tag{30}$$

$$B' = bp\_t \times B + sc \times bp\_t \times (B-Y) \tag{31}$$

The color transforming unit 43a performs the color transformation equal to that of the first embodiment on the input RGB signal by using Equations (29) to (31).

As described above, according to the present embodiment, even when the RGB color-space signal is input, it is possible to perform the brightness correction that can achieve the same effects as those of the first embodiment (when the input signal is formed of the luminance signal and the two color-difference signals).

In other words, the saturation-correction-parameter calculating unit 35 calculates the saturation correction parameter sc so that the saturation correction parameter sc increases as the luminance correction ratio bp_t increases. Furthermore, the saturation-correction-parameter calculating unit 35 calculates the saturation correction parameter sc so that the saturation correction parameter sc increases in the shadow region in which the maximum value Max(R, G, B) of the components of the input RGB signal remains small, and the saturation correction parameter sc decreases as the maximum value Max(R, G, B) of the components of the input RGB signal increases, so that occurrence of saturation can be prevented.

Furthermore, the saturation-correction-parameter calculating unit 35 calculates the saturation correction parameter sc so that the saturation correction parameter sc increases as the luminance correction ratio bp_t increases. Moreover, the saturation-correction-parameter calculating unit 35 calculates the saturation correction parameter sc so that the saturation correction parameter sc decreases (is suppressed) with increase in the achromatic level "gray".

Figure 11:
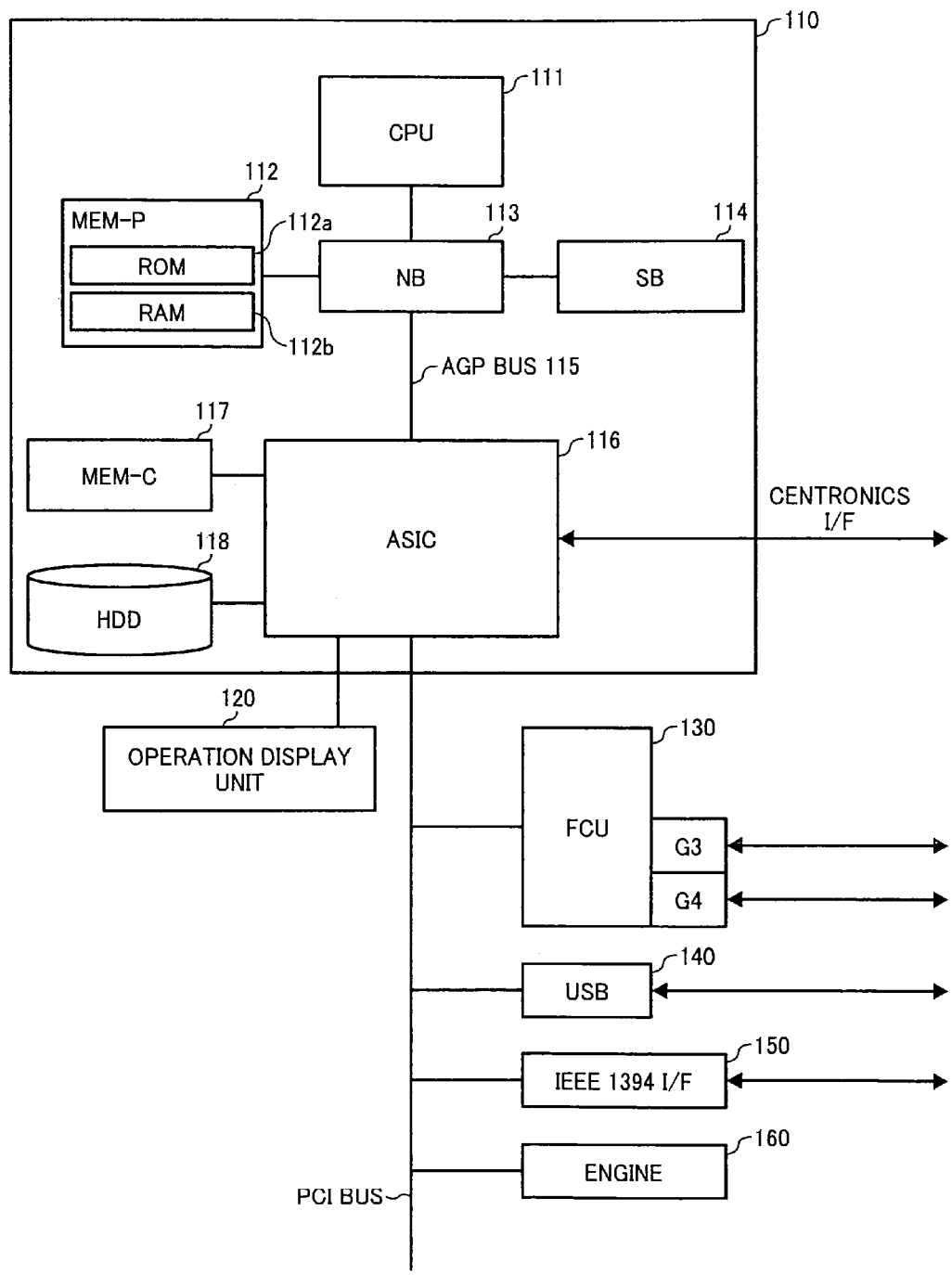
FIG. 11 is a block diagram of an exemplary hardware configuration of a multifunction peripheral to which the image processing apparatus according to an embodiment of the present invention is applied.

FIG. 11 is a block diagram of an exemplary hardware configuration of a multifunction peripheral (MFP) to which the image processing apparatus according to an embodiment of the present invention is applied. As illustrated in the drawing, the MFP includes a controller 110 and an engine unit (Engine) 160, which are connected to each other via a peripheral component interconnect (PCI) bus. The controller 110 controls the entire MFP, drawing, communication, and input from an operating unit (not shown). The engine unit 160 is a printer engine and the like that is connectable to a PCI bus. The engine unit 160 can be a monochrome plotter, a single-drum color plotter, a four-drum color plotter, a scanner, and a facsimile unit. The engine unit 160 is formed of an image processing member for performing error diffusion or gamma correction, in addition to a so-called engine member such as a plotter.

The controller 110 includes a central processing unit (CPU) 111, a north bridge (NB) 113, a system memory (MEM-P) 112, a south bridge (SB) 114, a local memory (MEM-C) 117, an application specific integrated circuit (ASIC) 116, and a hard disk drive (HDD) 118. The NB 113 and the ASIC 116 are connected to each other via an accelerated graphics port (AGP) bus 115. The MEM-P 112 includes a read only memory (ROM) 112a and a random access memory (RAM) 112b.

The CPU 111 controls the entire MFP, includes a chipset formed of the NB 113, the MEM-P 112, and the SB 114, and is connected to other devices via the chipset.

The NB 113 is a bridge for connecting the CPU 111 to each of the MEM-P 112, the SB 114, and the AGP bus 115, and includes a memory controller that controls read processing and write processing with respect to the MEM-P 112, a PCI master, and an AGP target.

The MEM-P 112 is a system memory that functions as a storage memory for storing computer programs and data, a load memory for loading computer programs and data, and a drawing memory for a printer, and includes the ROM 112a and the RAM 112b. The ROM 112a is a read only memory that functions as a storage memory for storing computer programs and data. The RAM 112b is a writable and readable memory that functions as a load memory for loading computer programs and data and a drawing memory for a printer.

The SB 114 is a bridge for connecting the NB 113 to each of PCI devices and peripheral devices. The SB 114 is connected to the NB 113 via the PCI bus. The PCI bus is also connected to a network interface (I/F) unit and the like.

The ASIC 116 is an integrated circuit (IC) for image processing, which is formed of hardware elements for image processing. The ASIC 116 functions as a bridge for connecting the AGP bus 115, the PCI bus, the HDD 118, and the MEM-C 117 to one another. The ASIC 116 includes a PCI target, an AGP master, an arbiter (ARB) that functions as a core of the ASIC 116, a memory controller that controls the MEM-C 117, a plurality of direct memory access controllers (DMACs) that performs operation of rotating image data by hardware logics, and a PCI unit that performs data transfer with the engine unit 160 via the PCI bus. The ASIC 116 is connected to a fax control unit (FCU) 130, a universal serial bus (USB) 140, and an Institute of Electrical and Electronics Engineers 1394 (IEEE 1394) I/F 150 via the PCI bus. An operation display unit 120 is directly connected to the ASIC 116.

The MEM-C 117 is a local memory to be used as a copy-image buffer and a code buffer. The HDD 118 is a storage for storing image data, computer programs, font data, and formats.

The AGP bus 115 is a bus I/F for a graphics accelerator card that is designed for increasing speed of graphics processing. The AGP bus 115 directly accesses the MEM-P 112 with high throughput to increase the speed of the graphics accelerator card.

An image processing program to be executed by the image processing apparatus of the present embodiment is stored in advance in a ROM and the like for distribution.

The image processing program to be executed by the image processing apparatus of the present embodiment can also be recorded in a computer-readable recording medium, such as a compact disk ROM (CD-ROM), a flexible disk (FD), a compact disk recordable (CD-R), and a digital versatile disk (DVD) for distribution, in an installable file format or a computer-executable file format.

Furthermore, the image processing program to be executed by the image processing apparatus of the present embodiment can be stored in another computer connected to a network such as the Internet such that the image processing program can be downloaded via the network. Moreover, the image processing program to be executed by the image processing apparatus of the present embodiment can be provided or distributed via a network such as the Internet.

The image processing program to be executed by the image processing apparatus is made up of modules that implement units of the image processing apparatus as described above (i.e., the gamma transforming unit, the RGB transforming unit, the correction-target-value calculating unit, the tone correcting unit, and the luminance transforming unit). As actual hardware, when the CPU (processor) reads and executes the image processing program from the ROM, the above modules are loaded on a main memory thereby creating, on the main memory, the units, i.e., the gamma transforming unit, the RGB transforming unit, the correction-target-value calculating unit, the tone correcting unit, and the luminance transforming unit.

Here, additional Related Art is described.

Comparing the technology disclosed in Japanese Patent No. 2748678, in which each of R, G, and B signals is multiplied by the ratio of the luminance signal obtained after the gamma transformation to the luminance signal present before the gamma transformation so that the brightness can be corrected while the RGB ratio is maintained, with the technology disclosed in Japanese Patent No. 3134660, in which the correction coefficient for the color-difference signals is limited to correct the image, quality of the image is remarkably degraded in the technology disclosed in Japanese Patent No. 3134660 because the brightness correction cannot adoptively be performed on a single image, while such a problem can hardly occur in the technology disclosed in Japanese Patent No. 2748678. Details will be described below by using an example of an image and by comparison of the technology disclosed in Japanese Patent No. 2748678 with the technology disclosed in Japanese Patent No. 3134660.

For example, in the image that shows the night scene containing the red light sign board, when RGB signals of a red portion are such that R=0.95, G=0.20, and B=0.20, respectively, the luminance signal Y and the color-difference signals Cb and Cr become such that Y=0.42, Cb=−0.13, and Cr=0.38, respectively, through calculation by using Equations (1) to (3).

In the technology disclosed in Japanese Patent No. 2748678, when gamma transformation is performed such that the luminance signal Y (in this example, 0.42) is doubled to thereby obtain a luminance signal Y_g (here, assumed as 0.85), each of the color-difference signals Cr and Cb is also doubled by the correction, so that the color-difference signals after the correction become such that Cb_g=−0.25 and Cr_g=0.75, respectively. When the luminance signal Y_g and the color-difference signals Cb_g and Cr_g are transformed into RGB signals by using Equations (4) to (6), the result is such that Rg=1.90, Gg=0.40, and Bg=0.40. When Rg is limited to 1 because Rg as a red (R) component is larger than the upper limit value of 1, RGB signals obtained after the limitation become such that Rg=1.00, Gg=0.40, and Bg=0.40, respectively. When the luminance signal Yt corresponding to Rg, Gg, and Bg signals that are obtained by the limitation is calculated by using Equation (1), the result is such that Yt=0.58.

On the other hand, in the technology disclosed in Japanese Patent No. 3134660, when the correction coefficient for the color-difference signals Cb and Cr is limited, and correction is performed so that, for example, each of the color-difference signals Cb and Cr is multiplied by 1.2 times, the result is such that Cb_g=−0.15 and Cr_g=0.45. When the luminance signal Y_g and the color-difference signals Cb_g and Cr_g are transformed into RGB signals, the result is such that Rg=1.48, Gg=0.58, and Bg=0.58. When Rg is limited to 1 because Rg as a red (R) component is larger than the upper limit value of 1, RGB signals obtained after the limitation become such that Rg=1.00, Gg=0.58, and Bg=0.58, respectively. When the luminance signal Yt corresponding to Rg, Gg, and Bg signals that are obtained by the limitation is calculated by using Equation (1), the result is such that Yt=0.71.

Here, comparing the technology disclosed in Japanese Patent No. 2748678 with the technology disclosed in Japanese Patent No. 3134660, the luminance signal Yt becomes 0.58 in the technology disclosed in Japanese Patent No. 2748678, while the luminance signal Yt becomes 0.71 in the technology disclosed in Japanese Patent No. 3134660. Accordingly, the luminance signal Yt (0.58) obtained in the technology disclosed in Japanese Patent No. 2748678 is closer to the luminance signal Y (0.42) that is present before the brightness correction than the luminance signal Yt (0.71) obtained in the technology disclosed in Japanese Patent No. 3134660.

As described above, when the gamma correction is performed on a high-brightness chromatic color, such as red or blue, it is often the case that saturation occurs, so that luminance may be corrected to a luminance that is different from desired gamma characteristics. This has led to an attempt to locally change the degree of correction to the brightness. However, the inventors of the present invention found that the brightness correction in the technology disclosed in Japanese Patent No. 2748678 may become effective in case of red (R=0.95, G=0.20, and B=0.20) like the above-mentioned example.

While, in the above embodiments, an example is used in which the image processing apparatus of the present invention is applied to the MFP that includes at least two functions from among a copier function, a printer function, a scanner function, and a facsimile function, the present invention can be applied to any image forming apparatuses such as an MFP, a printer, a scanner device, and a facsimile device.

According to one embodiment of the present invention, it is possible to prevent, with a simple configuration, a situation in which a region containing a high-brightness chromatic color, such as red or blue, may be corrected to contain a faded color, and, it is also possible to perform brightness correction so that change in hue and saturation in other regions can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
 a gamma transforming unit that performs gamma transformation on a first image signal, which is a YCbCr-color-space signal, based on a luminance component of the first image signal so as to maintain an RGB ratio of the first image signal, and outputs the gamma transformed first image signal as a second image signal;
 a RGB transforming unit that transforms the second image signal into an RGB-color-space signal;
 a correction-target-value calculating unit that calculates a correction target value as a target value for performing tone correction on the luminance component of the first image signal, based on the RGB-color-space signal; and
 a correcting unit that performs correction on a value of the first image signal based on the luminance component of the first image signal and the correction target value.

2. The image processing apparatus according to claim 1, wherein the correction-target-value calculating unit further includes
 a limiting unit that limits, when a component that exceeds a predetermined value is present in the RGB components contained in an image signal obtained by the gamma transforming unit through the gamma transformation, a value of the component to the predetermined value, and
 a luminance-value transforming unit that outputs, as the correction target value, a luminance component of a signal output from the limiting unit.

3. The image processing apparatus according to claim 1, wherein the tone correcting unit further includes
 a correction-parameter calculating unit that calculates a luminance correction ration that is a ratio of the correction target value to the luminance component of the image signal, and a saturation correction parameter for controlling a degree of correction to be performed on a color-difference component of the image signal, and
 a color transforming unit that performs tone correction on the image signal based on the luminance correction ratio and the saturation correction parameter.

4. The image processing apparatus according to claim 3, wherein the correction-parameter calculating unit further includes an RGB-maximum-value selecting unit that selects a maximum value of the RGB components of the image signal, and an achromatic-level calculating unit that calculates an achromatic level that represents how much degree a color expressed by the image signal is close to achromatic color, wherein the correction-parameter calculating unit calculates the saturation correction parameter based on the luminance correction ratio, the maximum value of the RGB components of the image signal, and the achromatic level.

5. The image processing apparatus according to claim 4, wherein the correction-parameter calculating unit calculates the saturation correction parameter so that the saturation correction parameter decreases as the maximum value of the RGB components of the image signal increases.

6. The image processing apparatus according to claim 4, wherein the correction-parameter calculating unit calculates the saturation correction parameter so that the saturation correction parameter decreases as the achromatic level increases.

7. The image processing apparatus according to claim 3, wherein the color transforming unit calculates a color-difference correction ratio based on the luminance correction ratio and the saturation-correction parameter such that the color-difference correction ratio increases as each of the luminance correction ratio and the saturation correction parameter increases, and performs color transformation by multiplying the color-difference component of the image data by the color-difference correction ratio.

8. An image processing method for an image processing apparatus comprising:

gamma-transforming that performs gamma transformation on a first image signal, which is a YCbCr-color-space signal, based on a luminance component of the first image signal so as to maintain an RGB ratio of the first image signal, and outputs the gamma transformed first image signal as a second image signal;

RGB transforming that transforms the second image signal into an RGB-color-space signal;

calculating that calculates a correction target value as a target value for performing correction on the luminance component of the first image signal, based on the RGB-color-space signal; and correcting that performs correction on a value of the first image signal based on the luminance component of the first image signal and the correction target value.

9. The image processing method according to claim 8, wherein the calculating further includes limiting that limits, when a component that exceeds a predetermined value is present in the RGB components contained in an image signal obtained at the gamma-transforming, a value of the component to the predetermined value, and luminance-value transforming that outputs, as the correction target value, a luminance component of a signal output at the limiting.

10. The image processing method according to claim 8, wherein the tone-correcting further includes correction-parameter calculating that calculates a luminance correction ration that is a ratio of the correction target value to the luminance component of the image signal, and a saturation correction parameter for controlling a degree of correction to be performed on a color-difference component of the image signal, and color-transforming that performs tone correction on the image signal based on the luminance correction ratio and the saturation correction parameter.

11. The image processing method according to claim 10, wherein the correction-parameter calculating further includes RGB-maximum-value selecting that selects a maximum value of the RGB components of the image signal, and achromatic-level calculating that calculates an achromatic level that represents how much degree a color expressed by the image signal is close to achromatic color, wherein the correction-parameter calculating calculates the saturation correction parameter based on the luminance correction ratio, the maximum value of the RGB components of the image signal, and the achromatic level.

12. The image processing method according to claim 11, wherein the correction-parameter calculating calculates the saturation correction parameter so that the saturation correction parameter decreases as the maximum value of the RGB components of the image signal increases.

13. The image processing method according to claim 11, wherein the correction-parameter calculating calculates the saturation correction parameter so that the saturation correction parameter decreases as the achromatic level increases.

14. The image processing method according to claim 10, wherein the color-transforming includes color-difference-correction-ratio calculating that calculates a color-difference correction ratio based on the luminance correction ratio and the saturation-correction parameter such that the color-difference correction ratio increases as each of the luminance correction ratio and the saturation correction parameter increases, and performing color transformation by multiplying the color-difference component of the image data by the color-difference correction ratio.

15. A non-transitory computer program product comprising a computer-usable medium having computer-readable program codes embodied in the medium for image processing in an image forming apparatus, the program codes when executed causing a computer to execute:

gamma-transforming that performs gamma transformation on a first image signal, which is a YCbCr-color-space signal, based on a luminance component of the first image signal so as to maintain an RGB ratio of the first image signal, and outputs the gamma transformed first image signal as a second image signal;

RGB transforming that transforms the second image signal into an RGB-color-space signal;

calculating that calculates a correction target value as a target value for performing correction on the luminance component of the first image signal, based on the RGB-color-space signal; and correcting that performs correction on a value of the first image signal based on the luminance component of the first image signal and the correction target value.

* * * * *